(12) United States Patent
Klimanis et al.

(10) Patent No.: US 10,853,025 B2
(45) Date of Patent: *Dec. 1, 2020

(54) SHARING OF CUSTOM AUDIO PROCESSING PARAMETERS

(71) Applicant: Dolby Laboratories Licensing Corporation, San Francisco, CA (US)

(72) Inventors: Gints Klimanis, Sunnyvale, CA (US); Noah Kraft, Brooklyn, NY (US); Matthew J. Jaffe, San Francisco, CA (US); Richard Fritz Lanman, III, San Francisco, CA (US); Jeffrey Baker, Newbury Park, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,863

(22) Filed: Apr. 29, 2019

(65) Prior Publication Data

US 2019/0324710 A1 Oct. 24, 2019

Related U.S. Application Data

(63) Continuation of application No. 15/383,117, filed on Dec. 19, 2016, now Pat. No. 10,275,209, which is a
(Continued)

(51) Int. Cl.
*G06F 3/16* (2006.01)
*H04L 29/08* (2006.01)
(Continued)

(52) U.S. Cl.
CPC ............ *G06F 3/165* (2013.01); *H04L 67/146* (2013.01); *H04R 1/1016* (2013.01);
(Continued)

(58) Field of Classification Search
CPC ........ G06F 3/165; G06F 16/68; G06F 16/683; G06F 16/686; G06F 21/31; G06F 21/44;
(Continued)

(56) References Cited

U.S. PATENT DOCUMENTS 5,566,237 A 10/1996 Dobbs et al.
5,576,685 A 11/1996 Saito
(Continued)

FOREIGN PATENT DOCUMENTS

EP 2846328 3/2015
WO 2013/069556 5/2013

*Primary Examiner* — Akelaw Teshale

(57) ABSTRACT

Personal audio systems and methods are disclosed. The personal audio system includes a processor configured to generate a processed ambient audio stream by processing the ambient audio stream in accordance with a selected set of processing parameters selected from the plurality of processing parameter sets stored in the memory, a communications interface configured to receive a new set of processing parameters, selected by someone other than the user, and a controller configured to instruct the processor to begin generating the processed ambient audio stream by using the new set of processing parameters.

20 Claims, 9 Drawing Sheets

Related U.S. Application Data continuation of application No. 15/052,682, filed on Feb. 24, 2016, now Pat. No. 9,584,899, which is a continuation-in-part of application No. 14/997,320, filed on Jan. 15, 2016, now Pat. No. 9,703,524, which is a continuation-in-part of application No. 14/952,761, filed on Nov. 25, 2015, now Pat. No. 9,678,709.

(51) Int. Cl.
    *H04R 1/10*     (2006.01)
    *H04R 3/04*     (2006.01)

(52) U.S. Cl.
    CPC ............. *H04R 1/1083* (2013.01); *H04R 3/04* (2013.01); *H04R 2430/01* (2013.01); *H04R 2460/07* (2013.01)

(58) Field of Classification Search
CPC ..... G06F 21/6245; H04R 3/04; H04R 1/1083; H04R 1/1016; H04R 2460/07; H04R 2430/01; H04R 2420/07; H04R 27/00; H04R 2227/003; H04R 2205/041; H04R 25/50; H04R 25/70; H04R 5/033; H04R 5/04; H04R 2225/55; H04R 2460/01; H04R 25/453; H04L 67/146; H04L 65/602; H04L 67/18; H04L 65/00; H04S 7/303; H04S 7/306

See application file for complete search history.

(56) References Cited

U.S. PATENT DOCUMENTS

| | | | |
|---|---|---|---|
| 5,604,812 A | 2/1997 | Meyer | |
| 6,868,162 B1 | 3/2005 | Jubien et al. | |
| 7,283,850 B2 | 10/2007 | Granovetter et al. | |
| 7,391,877 B1 | 6/2008 | Brungart | |
| 8,306,204 B2 | 11/2012 | Erhart et al. | |
| 8,335,312 B2 | 12/2012 | Gerhardt et al. | |
| 8,588,432 B1* | 11/2013 | Simon | H04R 3/12 381/82 |
| 8,649,540 B2 | 2/2014 | Killion et al. | |
| 8,718,291 B2 | 5/2014 | Alves et al. | |
| 8,750,544 B2 | 6/2014 | Killion et al. | |
| 9,191,744 B2* | 11/2015 | Anderson | H04R 5/04 |
| 9,253,560 B2 | 2/2016 | Goldstein et al. | |
| 2001/0005420 A1 | 6/2001 | Takagi et al. | |
| 2003/0002706 A1* | 1/2003 | Keliiliki | H04R 1/1066 381/381 |
| 2004/0052391 A1 | 3/2004 | Bren et al. | |
| 2006/0045294 A1* | 3/2006 | Smyth | H04S 7/304 381/309 |
| 2008/0112569 A1 | 5/2008 | Asada | |
| 2008/0118078 A1 | 5/2008 | Asada et al. | |
| 2008/0181419 A1 | 7/2008 | Goldstein et al. | |
| 2009/0254340 A1 | 10/2009 | Sun et al. | |
| 2010/0022269 A1 | 1/2010 | Terlizzi | |
| 2010/0033313 A1 | 2/2010 | Keady et al. | |
| 2010/0040249 A1 | 2/2010 | Lenhardt | |
| 2010/0086137 A1 | 4/2010 | Nicolino, Jr. et al. | |
| 2010/0128907 A1 | 5/2010 | Dijkstra et al. | |
| 2010/0146445 A1 | 6/2010 | Kraut | |
| 2010/0172510 A1 | 7/2010 | Juvonen | |
| 2011/0096933 A1 | 4/2011 | Eastty | |
| 2011/0103613 A1 | 5/2011 | Van Der Werf et al. | |
| 2011/0158420 A1 | 6/2011 | Hannah | |
| 2011/0188389 A1 | 8/2011 | Hedley et al. | |
| 2011/0222700 A1 | 9/2011 | Bhandari | |
| 2011/0228950 A1 | 9/2011 | Abrahamsson et al. | |
| 2011/0243344 A1 | 10/2011 | Bakalos et al. | |
| 2011/0280409 A1* | 11/2011 | Michael | H04R 5/04 381/60 |
| 2011/0293123 A1 | 12/2011 | Neumeyer et al. | |
| 2012/0010881 A1 | 1/2012 | Avendano et al. | |
| 2012/0189140 A1* | 7/2012 | Hughes | H04M 3/56 381/123 |
| 2013/0208909 A1 | 8/2013 | Mulder | |
| 2013/0236040 A1 | 9/2013 | Crawford et al. | |
| 2014/0044269 A1 | 2/2014 | Anderson | |
| 2014/0046659 A1 | 2/2014 | Burton et al. | |
| 2014/0079241 A1* | 3/2014 | Chan | H04N 21/8106 381/77 |
| 2014/0079243 A1 | 3/2014 | Appell et al. | |
| 2014/0105412 A1 | 4/2014 | Alves et al. | |
| 2014/0119559 A1* | 5/2014 | Goldstein | H04R 1/1016 381/74 |
| 2014/0185828 A1 | 7/2014 | Helbling | |
| 2014/0198926 A1 | 7/2014 | Killion et al. | |
| 2014/0211972 A1 | 7/2014 | Kim et al. | |
| 2014/0221017 A1 | 8/2014 | Jensen et al. | |
| 2014/0233744 A1* | 8/2014 | Risberg | H03G 9/005 381/61 |
| 2014/0277650 A1 | 9/2014 | Zurek et al. | |
| 2014/0314245 A1 | 10/2014 | Asada et al. | |
| 2014/0314261 A1 | 10/2014 | Selig et al. | |
| 2014/0321660 A1 | 10/2014 | Harsch | |
| 2014/0334644 A1 | 11/2014 | Selig et al. | |
| 2015/0003652 A1 | 1/2015 | Bisgaard et al. | |
| 2015/0063575 A1 | 3/2015 | Tan | |
| 2015/0162021 A1 | 6/2015 | Anhari et al. | |
| 2015/0190284 A1 | 7/2015 | Censo et al. | |
| 2016/0259619 A1 | 9/2016 | Appell et al. | |

\* cited by examiner

SHARING OF CUSTOM AUDIO PROCESSING PARAMETERS

RELATED APPLICATION INFORMATION

The present application is a continuation of U.S. application Ser. No. 15/383,117 filed Dec. 19, 2016 for "Sharing of Custom Audio Processing Parameters", which is a continuation of U.S. application Ser. No. 15/052,682 filed Feb. 24, 2016 for "Sharing of Custom Audio Processing Parameters", which is a continuation-in-part of U.S. application Ser. No. 14/997,320 filed Jan. 15, 2016 for "Privacy Protection in Collective Feedforward", which is a continuation-in-part of U.S. application Ser. No. 14/952,761 filed Nov. 25, 2015 for "Processing Sound Using Collective Feedforward". The present application is related to U.S. application Ser. No. 14/681,843 for "Active Acoustic Filter with Location-Based Filter Characteristics" filed Apr. 8, 2015; and U.S. application Ser. No. 14/819,298 for "Active Acoustic Filter with Automatic Selection Of Filter Parameters Based on Ambient Sound" filed Aug. 5, 2015.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the sharing of digital active audio filters for use in a listener's ear to modify ambient sound to suit the listening preferences of the listener.

Description of the Related Art

Humans' perception to sound varies with both frequency and sound pressure level (SPL). For example, humans do not perceive lower and higher frequency sounds as well as they perceive sounds at midrange frequencies between 500 Hz and 6,000 Hz. Further, human hearing is more responsive to sound at high frequencies compared to low frequencies.

There are many situations where a listener may desire attenuation of ambient sound at certain frequencies, while allowing ambient sound at other frequencies to reach their ears. For example, at a concert, concert goers might want to enjoy the music, but also be protected from high levels of mid-range sound frequencies that cause damage to a person's hearing. On an airplane, passengers might wish to block out the roar of the engine, but not conversation. At a sports event, fans might desire to hear the action of the game, but receive protection from the roar of the crowd. At a construction site, a worker may need to hear nearby sounds and voices for safety and to enable the construction to continue, but may wish to protect his or her ears from sudden, loud noises of crashes or large moving equipment. Further, a user may wish to engage in conversation and other activities without being interrupted or impaired by annoyance noises such as sounds of engines or motors, crying babies, and sirens. These are just a few common examples where people wish to hear some, but not all, of the sounds in their environment.

In addition to receiving protection from unpleasant or dangerously loud sound levels, listeners may wish to augment the ambient sound by amplification of certain frequencies, combining ambient sound with a secondary audio feed, equalization (modifying ambient sound by adjusting the relative loudness of various frequencies), noise reduction, addition of white or pink noise to mask annoyances, echo cancellation, and addition of echo or reverberation. For example, at a concert, audience members may wish to attenuate certain frequencies of the music, but amplify other frequencies (e.g., the bass). People listening to music at home may wish to have a more "concert-like" experience by adding reverberation to the ambient sound. At a sports event, fans may wish to attenuate ambient crowd noise, but also receive an audio feed of a sportscaster reporting on the event. Similarly, people at a mall may wish to attenuate the ambient noise, yet receive an audio feed of advertisements targeted to their location. These are just a few examples of peoples' listening preferences.

Throughout this description, elements appearing in figures are assigned three-digit reference designators. An element not described in conjunction with a figure has the same characteristics and function as a previously-described element having the same reference designator.

DETAILED DESCRIPTION

Description of Apparatus

Figure 1:
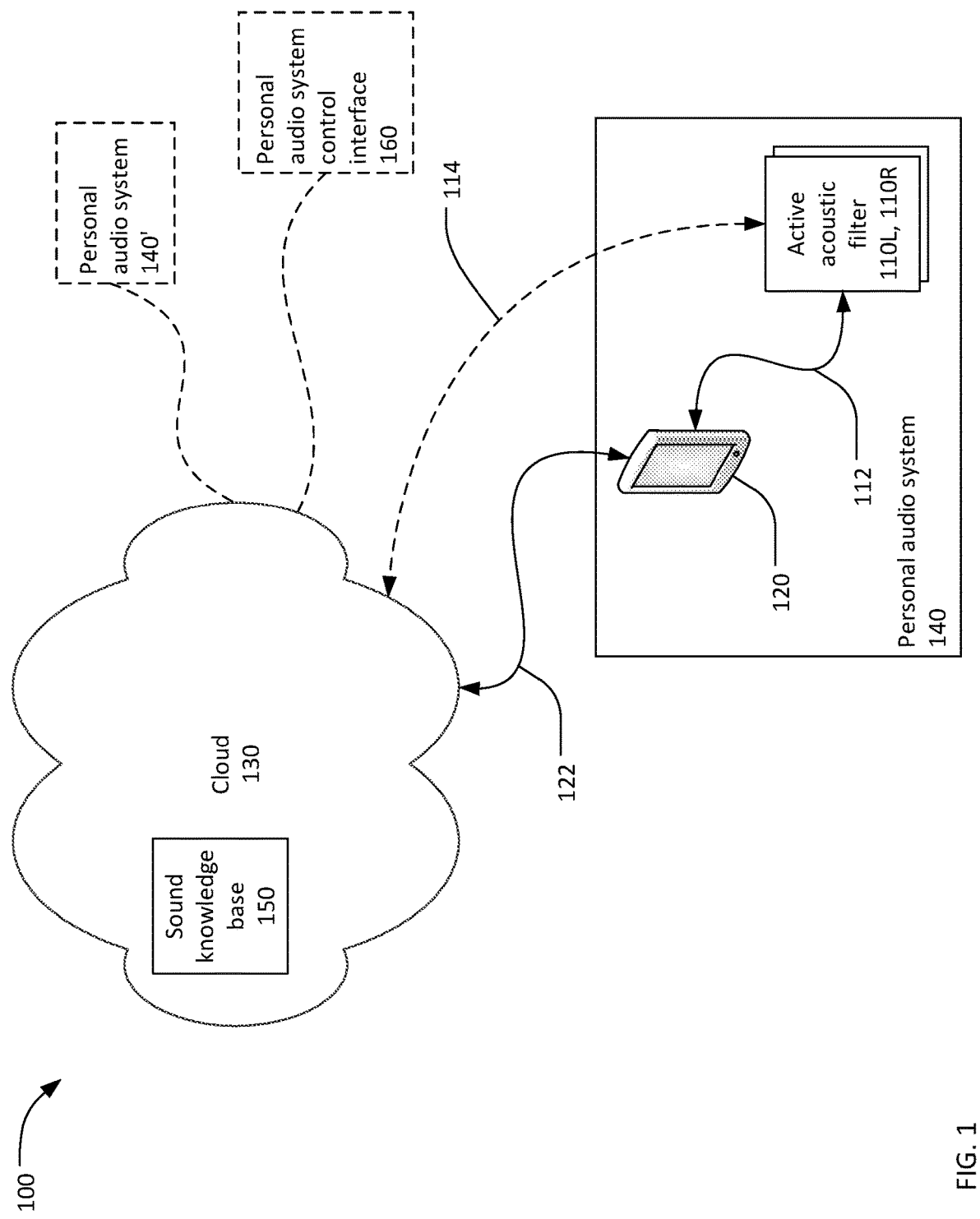
FIG. 1 is a block diagram of a sound processing system.

Referring now to FIG. 1, a sound processing system 100 includes at least one personal audio system 140 and a sound knowledgebase 150 within a cloud 130. The sound processing system may, optionally, include additional personal audio system(s) such as personal audio system 140' and may include one or more personal audio system control interfaces, such as personal audio system control interface 160. The sound processing system 100 may include a large plurality of personal audio systems. In this context, the term "cloud" means a network and all devices that may be accessed by the personal audio system 140 via the network. The term "device" means an apparatus capable of communicating via a network or other digital communications link. Examples of devices include cellular phones, computing tablets, portable computers, desk-top computers, servers, network storage units, and peripheral devices. The cloud 130 may be a local area network, wide area network, a virtual network, or some other form of network together with all devices connected to the network. The cloud 130 may be or include the Internet. The term "knowledgebase" connotes a device that not only stores data, but also learns and stores other knowledge derived from the data. The sound knowledgebase 150 may include a database and one or more servers. The sound knowledgebase 150 will be described in further detail during the discussion of FIG. 5.

The personal audio system 140 includes left and right active acoustic filters 110L, 110R and a personal computing device 120. While the personal computing device 120 is shown in FIG. 1 as a smart phone, the personal computing device 120 may be a smart phone, a desktop computer, a mobile computer, a tablet computer, or any other computing device that is capable of performing the processes described herein. The personal computing device 120 may include one or more processors and memory configured to execute stored software instructions to perform the processes described herein. The personal audio system 140', representative of one or more additional personal audio systems, is substantially similar to personal audio system 140.

The personal audio system control interface 160 is similar to personal audio system 140 and specifically includes functionality to enable communication with the cloud 130 and/or the personal audio system 140 directly. As will be discussed more fully below, the personal audio system control interface 160 may be a stand-alone computing device or make up a part of a computing device or audio output device. The personal audio system control interface 160 may be used to provide instructions as to which settings one or more personal audio systems, like personal audio system 140 and personal audio system 140' may use to process ambient sound. These instructions may be requested and transmitted to personal audio system(s) in one of several ways.

The active acoustic filters 110L, 110R communicate with the personal computing device 120, such as via a first wireless communications link 112. While only a single first wireless communications link 112 is shown in FIG. 1, each active acoustic filter 110L, 110R may communicate with the personal computing device 120 via separate wireless communication links. The first wireless communications link 112 may use a limited-range wireless communications protocol such as Bluetooth®, WiFi®, ZigBee®, or some other wireless Personal Area Network (PAN) protocol. Alternatively, there may be a direct connection from the personal computing device 120 to one of the active acoustic filters, and an indirect connection to the other active acoustic filter. The indirect connection may be through the direct connection, wherein the directly connected active acoustic filter acts as a relay to the indirectly connected active acoustic filter.

The personal computing device 120 communicates with the cloud 130, for example, via a second communications link 122. In particular, the personal computing device 120 may communicate with the sound knowledgebase 150 within the cloud 130 via the second communications link 122. The second communications link 122 may be a wired connection or may be a wireless communications link using, for example, the WiFi® wireless communications protocol, a mobile telephone data protocol, or another wireless communications protocol.

Optionally, the acoustic filters 110L, 110R may communicate directly with the cloud 130 via a third wireless communications link 114. The third wireless communications link 114 may be an alternative to, or in addition to, the first wireless communications link 112. The third wireless connection 114 may use, for example, the WiFi® wireless communications protocol, or another wireless communications protocol. The acoustic filters 110L, 110R may communicate with each other via a fourth wireless communications link (not shown). This fourth wireless communication link may provide an indirect connection of one active acoustic filter to the cloud 130 through the other active acoustic filter.

Figure 2:
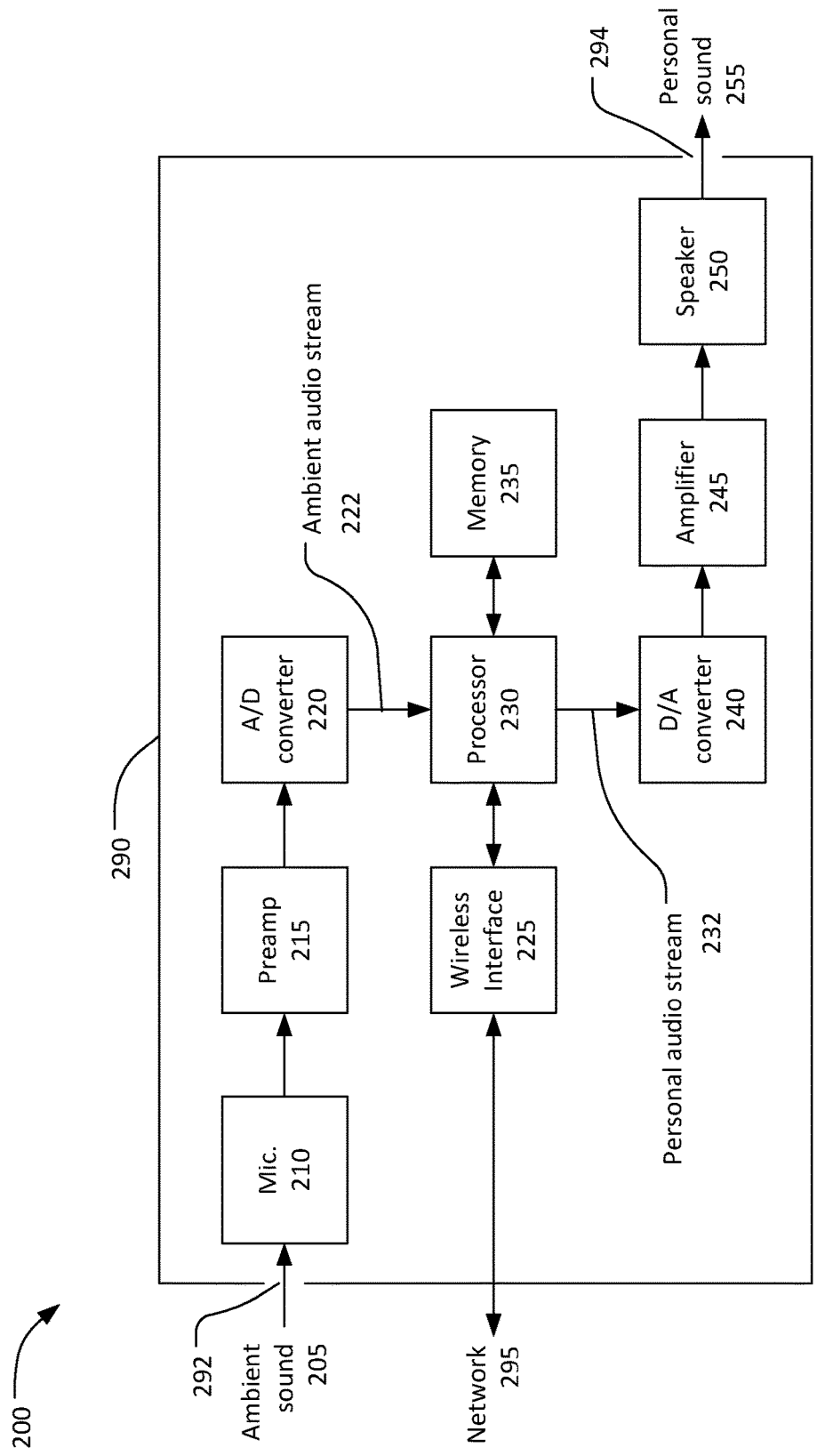
FIG. 2 is block diagram of an active acoustic filter.

FIG. 2 is block diagram of an active acoustic filter 200, which is representative of the active acoustic filter 110L and the active acoustic filter 110R. The active acoustic filter 200 includes at least one microphone 210, a preamplifier 215, an analog-to-digital (A/D) converter 220, a wireless interface 225, a processor 230, a memory 235, a digital-to-analog (D/A) converter 240, an amplifier 245, a speaker 250, and a battery (not shown), all of which may be contained within a housing 290. The active acoustic filter 200 receives ambient sound 205 and outputs personal sound 255. In this context, the term "sound" refers to acoustic waves propagating in air. "Personal sound" means sound that has been processed, modified, or tailored in accordance with a user's personal preferences. The term "audio" refers to an electronic representation of sound, which may be an analog signal or digital data.

The housing 290 is configured to interface with a user's ear by fitting in, on, or over the user's ear such that the ambient sound 205 is mostly excluded from reaching the user's ear canal and the personal sound 255 generated by the active acoustic filter is provided directly into the user's ear canal.

The housing 290 has at least a first aperture 292 for accepting the ambient sound 205 and a second aperture 294 to allow the personal sound 255 to be output into the user's outer ear canal. The housing 290 may have more than one aperture for accepting ambient sound, each of which may be coupled to a separate microphone. The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts the ambient sound 205 into an electrical signal that is amplified by preamplifier 215 and converted into an ambient audio stream 222 by A/D converter 220. In this context, the term "stream" means a sequence of digital samples. The "ambient audio stream" is a sequence of digital samples representing the ambient sound received by the active acoustic filter 200. The ambient audio stream 222 is processed by processor 230 to provide a personal audio stream 232. The processing performed by the processor 230 will be discussed in more detail subsequently. The personal audio stream 232 is converted into an analog signal by D/A converter 240. The analog signal output from D/A converter 240 is amplified by amplifier 245 and converted into personal sound 255 by speaker 250.

The microphone 210 may be one or more transducers for converting sound into an electrical signal that is sufficiently compact for use within the housing 290. The preamplifier 215 is configured to amplify the electrical signal output from the microphone 210 to a level compatible with the input of the A/D converter 220. The preamplifier 215 may be integrated into the A/D converter 220, which, in turn, may be integrated with the processor 230. In the situation where the active acoustic filter 200 contains more than one microphone, a separate preamplifier may be provided for each microphone.

The A/D converter 220 digitizes the output from preamplifier 215, which is to say converts the output from preamplifier 215 into a series of digital ambient audio samples at a rate at least twice the highest frequency present in the ambient sound. For example, the A/D converter may output the ambient audio stream 222 in the form of sequential audio samples at rate of 40 kHz or higher. The resolution of the ambient audio stream 222 (i.e., the number of bits in each audio sample) may be sufficient to minimize or avoid audible sampling noise in the processed output sound 255. For example, the A/D converter 220 may output an ambient audio stream 222 having 12 or more bits of amplitude resolution. In the situation where the active acoustic filter 200 contains more than one microphone with respective preamplifiers, the outputs from the preamplifiers may be digitized separately, or the outputs of some or all of the preamplifiers may be combined prior to digitization.

The wireless interface 225 provides digital acoustic filter 200 with a connection to one or more wireless networks 295 using a limited-range wireless communications protocol such as Bluetooth®, WiFi®, ZigBee®, or other wireless personal area network protocol. The wireless interface 225 may be used to receive data such as parameters for use by the processor 230 in processing the ambient audio stream 222 to produce the personal audio stream 232. The wireless interface 225 may be used to receive a secondary audio feed. The wireless interface 225 may be used to export the personal audio stream 232, which is to say transmit the personal audio stream 232 to a device external to the active acoustic filter 200. The external device may then, for example, store and/or publish the personal audio stream, for example via social media.

The processor 230 may include one or more processor devices such as a microcontroller, a microprocessor, and/or a digital signal processor. The processor 230 can include and/or be coupled to the memory 235. The memory 235 may store software programs, which may include an operating system, for execution by the processor 230. The memory 235 may also store data for use by the processor 230. The data stored in the memory 235 may include, for example, digital sound samples and intermediate results of processes performed on the ambient audio stream 222. The data stored in the memory 235 may also include a user's listening preferences, and/or rules and parameters for applying particular processes to convert the ambient audio stream 222 into the personal audio stream 232. The memory 235 may include a combination of read-only memory, flash memory, and static or dynamic random access memory.

The D/A converter 240 converts the personal audio stream 232 from the processor 230 into an analog signal. The processor 230 outputs the personal audio stream 232 as a series of samples typically, but not necessarily, at the same rate as the ambient audio stream 222 is generated by the A/D converter 220. The analog signal output from the D/A converter 240 is amplified by the amplifier 245 and converted into personal sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

A battery or other power supply (not shown) provides power to various elements of the active acoustic filter 200. The battery may be, for example, a zinc-air battery, a lithium ion battery, a lithium polymer battery, a nickel cadmium battery, or a battery using some other technology.

The depiction in FIG. 2 of the active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the processor 230, the memory 235, the analog signal by digital-to-analog (D/A) converter 240, the amplifier 245, and the wireless interface 225 may be contained within a common signal processor circuit device.

Figure 3:
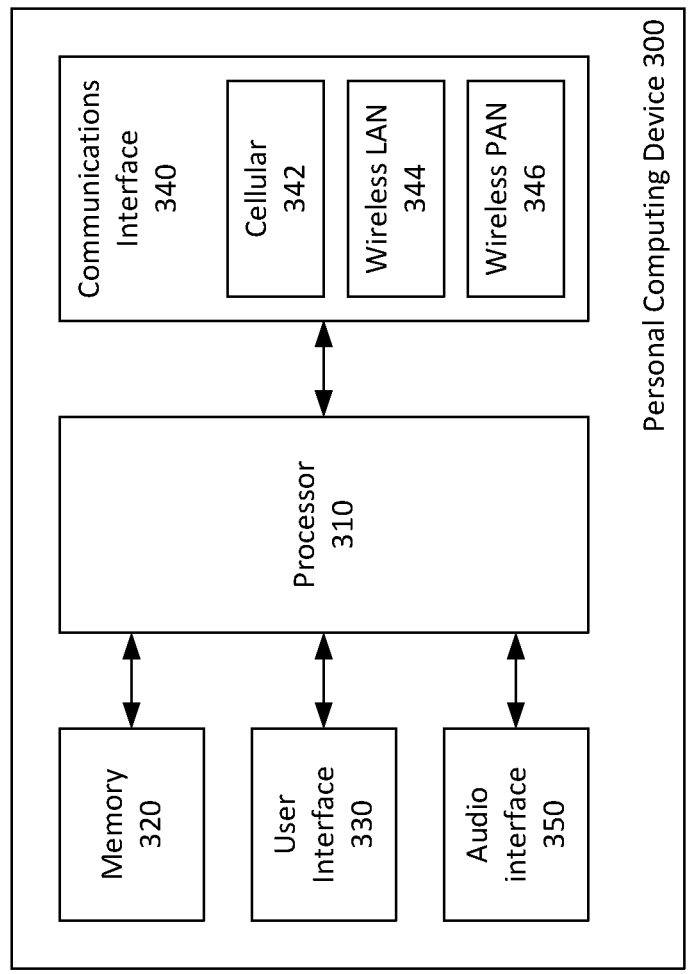
FIG. 3 is a block diagram of a personal computing device.

FIG. 3 is a block diagram of an exemplary personal computing device 300, which may be the personal computing device 120 or may be the personal audio system control interface 160 of FIG. 1. As shown in FIG. 3, the personal computing device 300 includes a processor 310, memory 320, a user interface 330, a communications interface 340, and an audio interface 350. Some of these elements may or might not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 320 may store software programs and routines for execution by the processor. These stored software programs may include an operating system such as the Apple® MacOS or IOS operating systems or the Android® operating system. The operating system may include functions to support the communications interface 340, such as protocol stacks, coding/decoding, compression/decompression, and encryption/decryption. The stored software programs may include an application or "app" to cause the personal computing device to perform portions of the processes and functions described herein.

The user interface 330 may include a display and one or more input devices such as a touch screen.

The communications interface 340 includes at least one interface for wireless communication with external devices. The communications interface 340 may include one or more of a cellular telephone network interface 342, a wireless local area network (LAN) interface 344, and/or a wireless personal area network (PAN) interface 336. The cellular telephone network interface 342 may use one or more cellular data protocols. The wireless LAN interface 344 may use the WiFi® wireless communication protocol or another wireless local area network protocol. The wireless PAN interface 346 may use a limited-range wireless communication protocol such as Bluetooth®, Wi-Fi®, ZigBee®, or some other public or proprietary wireless personal area network protocol. When the personal computing device 300 is deployed as part of a personal audio system, such as the personal audio system 140, the wireless PAN interface 346 may be used to communicate with the active acoustic filter devices 110L, 110R. The cellular telephone network interface 342 and/or the wireless LAN interface 344 may be used to communicate with the cloud 130.

The communications interface 340 may include radio-frequency circuits, analog circuits, digital circuits, one or more antennas, and other hardware, firmware, and software necessary for communicating with external devices. The communications interface 340 may include one or more processors to perform functions such as coding/decoding, compression/decompression, and encryption/decryption as necessary for communicating with external devices using selected communications protocols. The communications interface 340 may rely on the processor 310 to perform some or all of these function in whole or in part.

The audio interface 350 may be configured to both input and output sound. The audio interface 350 may include more or more microphones, preamplifiers and A/D converters that perform similar functions as the microphone 210, preamplifier 215 and A/D converter 220 of the active acoustic filter 200. The audio interface 350 may include more or more D/A converters, amplifiers, and speakers that perform similar functions as the D/A converter 240, amplifier 245 and speaker 250 of the active acoustic filter 200.

The personal computing device 300 may be configured to perform geo-location, which is to say to determine its own location. Geo-location may be performed, for example, using a Global Positioning System (GPS) receiver or by some other method.

Figure 4:
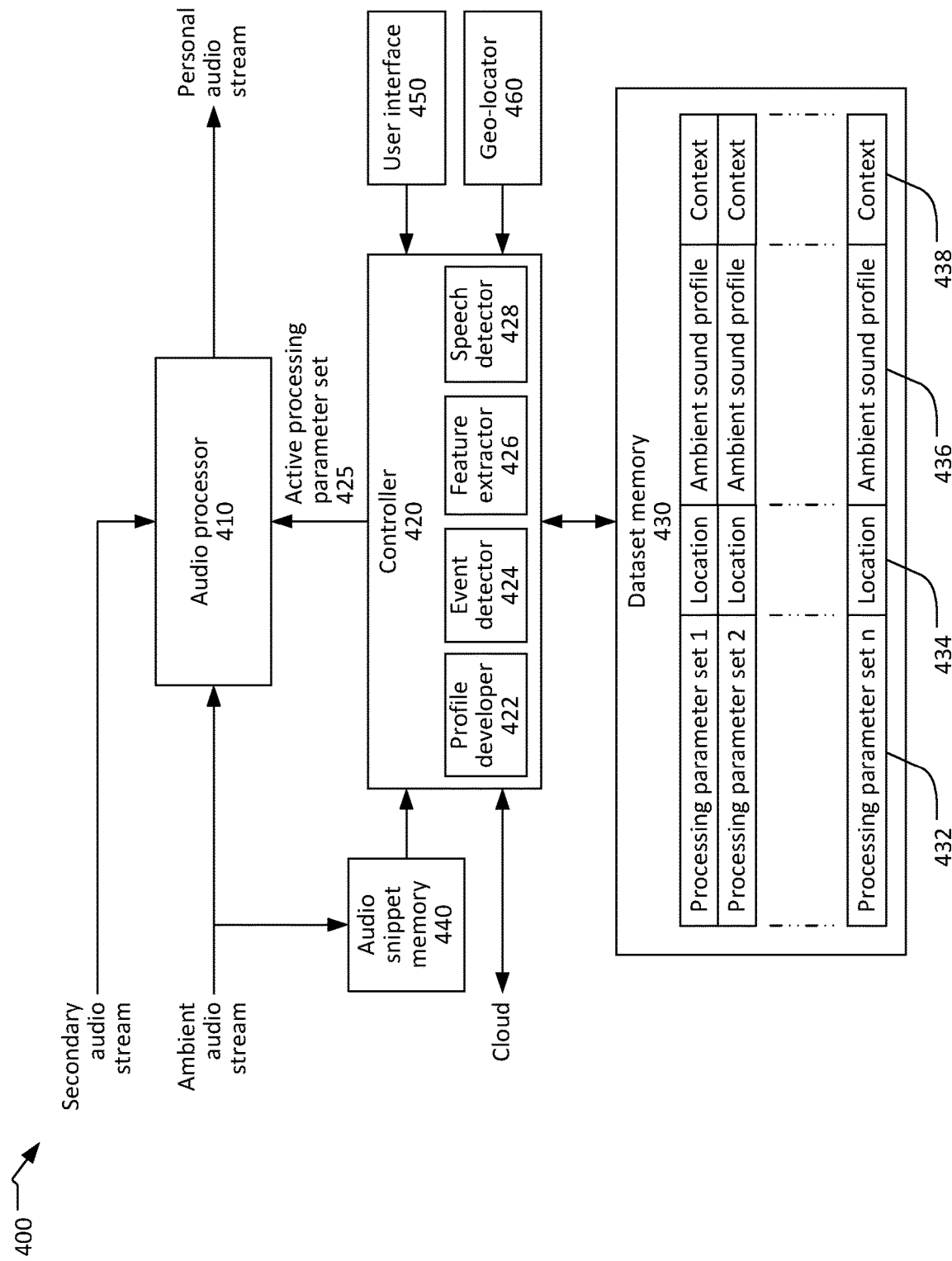
FIG. 4 is a functional block diagram of a portion of a personal audio system.

FIG. 4 shows a functional block diagram of a portion of an exemplary personal audio system 400, which may be the personal audio system 140. The personal audio system 400 includes one or two active acoustic filters, such as the active acoustic filters 110L, 110R, and a personal computing device, such as the personal computing device 120. The functional blocks shown in FIG. 4 may be implemented in hardware, by software running on one or more processors, or by a combination of hardware and software. The functional blocks shown in FIG. 4 may be implemented within the personal computing device, or within one or both active acoustic filters, or may be distributed between the personal computing device and the active acoustic filters.

The personal audio system 400 includes an audio processor 410, a controller 420, a dataset memory 430, an audio snippet memory 440, a user interface 450 and a geo-locator 460. The audio processor 410 and/or the controller 420 may include their own memory, which is not shown, for storing program instructions, intermediate results, and other data.

The audio processor 410 may be or include one or more microprocessors, microcontrollers, digital signal processors, application specific integrated circuits (ASICs), or a system-on-a-chip (SOCs). The audio processor 410 may be located within an active acoustic filter, within the personal computing device, or may be distributed between a personal computing device and one or two active acoustic filters.

The audio processor 410 receives and processes a digital ambient audio stream, such as the ambient audio stream 222, to provide a personal audio stream, such as the personal audio stream 232. The audio processor 410 may perform processes including filtering, equalization, compression, limiting, and/or other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount.

The audio processor 410 may also add echo or reverberation to the ambient audio stream. The audio processor 410 may also detect and cancel an echo in the ambient audio stream. The audio processor 410 may further perform noise reduction processing.

The audio processor 410 may receive a secondary audio stream. The audio processor 410 may incorporate the secondary audio stream into the personal audio stream. The secondary audio stream may be added to the ambient audio stream before processing, after all processing of the ambient audio stream is performed, or at an intermediate stage in the processing of the ambient audio stream. The secondary audio stream might not be processed, or may be processed in the same manner as or in a different manner than the ambient audio stream.

The audio processor 410 may process the ambient audio stream, and optionally the secondary audio stream, in accordance with an active processing parameter set 425. The active processing parameter set 425 may define the type and degree of one or more processes to be performed on the ambient audio stream and, when desired, the secondary audio stream. The active processing parameter set may include numerical parameters, filter models, software instructions, and other information and data to cause the audio processor to perform desired processes on the ambient audio stream. The extent and format of the information and data within active processing parameter set 425 may vary depending on the type of processing to be performed. For example, the active processing parameter set 425 may define filtering by a low pass filter with a particular cut-off frequency (the frequency at which the filter start to attenuate) and slope (the rate of change of attenuation with frequency) and/or compression using a particular function (e.g. logarithmic). For further example, the active processing parameter set 425 may define the plurality of frequency bands for equalization and provide a respective attenuation or gain for each frequency band. In yet another example, the processing parameters may define a delay time and relative amplitude of an echo to be added to the digitized ambient sound.

The audio processor 410 may receive the active processing parameter set 425 from the controller 420. The controller 420, in turn, may obtain the active processing parameter set 425 from the user via the user interface 450, from the cloud (e.g. from the sound knowledgebase 150 or another device within the cloud), or from the dataset memory 430 within the personal audio system 400.

The dataset memory 430 may store one or more processing parameter sets 432, which may include a copy of the active processing parameter set 425. The dataset memory 430 may store dozens or hundreds or an even larger number of processing parameter sets 432. Each processing parameter set 432 may be associated with at least one indicator, where an "indicator" is data indicating conditions or circumstances where the associated processing parameter set 432 is appropriate for selection as the active processing parameter set 425. The indicators associated with each processing parameter set 432 may include one or more of a location 434, an ambient sound profile 436, and a context 438. The combination of a processing parameter set and its associated indicators is considered a "dataset".

Locations 434 may be associated with none, some, or all of the processing parameter sets 432 and stored in the dataset memory 430. Each location 434 defines a geographic position or limited geographic area where the associated set of processing parameters 432 is appropriate. A geographic position may be defined, for example, by a street address, longitude and latitude coordinates, GPS coordinates, or in some other manner. A geographic position may include fine-grained information such as a floor or room number in a building. A limited geographic area may be defined, for example, by a center point and a radius, by a pair of coordinates identifying diagonal corners of a rectangular area, by a series of coordinates identifying vertices of a polygon, or in some other manner.

Ambient sound profiles 436 may be associated with none, some, or all of the processing parameter sets 432 and stored in the dataset memory 430. Each ambient sound profile 436 defines features and characteristics of an ambient sound environment in which the associated processing parameter set 432 is appropriate. Each ambient sound profile 436 may define the features and characteristics of the ambient sound environment by a finite number of numerical values. For example, an ambient profile may include numerical values for some or all of an overall loudness level, a normalized or absolute loudness of predetermined frequency bands, a spectral envelope shape, spectrographic features such as rising or falling pitch, frequencies and normalized or absolute loudness levels of dominant narrow-band sounds, an indicator of the presence or absence of odd and/or even harmonics, a normalized or absolute loudness of noise, a low frequency periodicity (e.g. the "beat" when the ambient sound includes music), and numerical values quantifying other features and/or characteristics.

Contexts 438 may be associated with none, some, or all of the processing parameter sets 432 and stored in the dataset memory 430. Each context 438 is a descriptive name of an environment or situation in which the associated processing parameter set 432 is appropriate. Examples of contexts include "airplane cabin," "subway," "urban street," "siren," and "crying baby." A context is not necessarily associated with a specific geographic location, but may be associated with a generic location such as, for example, "airplane," "subway," and "urban street." A context may be associated with a type of ambient sound such as, for example, "siren," "crying baby," and "rock concert." A context may be associated with one or more sets of processing parameters. When a context is associated with multiple processing parameter sets 432, selection of a particular processing parameter set may be based on location or ambient sound profile. For example, "siren" may be associated with a first set of processing parameters for locations in the United States and a different set of processing parameters for locations in Europe.

The controller 420 may select a processing parameter set 432 for use as the active processing parameter set 425 based on location, ambient sound profile, context, or a combination thereof. Retrieval of a processing parameter set 432 may be requested by the user via the user interface 450. Alternatively or additionally, retrieval of a processing parameter set 432 may be initiated automatically by the controller 420.

For example, the controller 420 may include a profile developer 422 to analyze the ambient audio stream to develop a current ambient sound profile. In this case, the controller 420 compares the current ambient sound profile with a stored prior ambient sound profile. When the current ambient sound profile is judged, according to first predetermined criteria, to be substantially different from the prior ambient sound profile, the controller 420 initiates retrieval of a new processing parameter set 432.

The personal audio system 400 may contain a geo-locator 460. The geo-locator 460 determines a geographic location of the personal audio system 400 using GPS, cell tower triangulation, or some other method. As described in co-pending application Ser. No. 14/681,843, entitled "Active Acoustic Filter with Location-Based Filter Characteristics," the controller 420 may compare the geographic location of the personal audio system 400, as determined by the geo-location 460, with location indicators 434 stored in the dataset memory 430. When one of the location indicators 434 matches, according to second predetermined criteria, the geographic location of the personal audio system 400, the associated processing parameter set 432 may be retrieved and provided to the audio processor 410 as the active processing parameter set 425.

As described in co-pending application Ser. No. 14/819,298, entitled "Active Acoustic Filter with Automatic Selection of Filter Parameters Based on Ambient Sound," the controller may select a processing parameter set 432 based on the ambient sound. The controller 420 may compare the profile of the ambient sound, as determined by the profile developer 422, with profile indicators 436 stored in the dataset memory 430. When one of the profile indicators 436 matches, according to third predetermined criteria, the profile of the ambient sound, the associated processing parameter set 432 may be retrieved and provided to the audio processor 410 as the active processing parameter set 425.

In some circumstances, for example upon user request or when a matching location or profile is not found in the dataset memory 430, the controller 420 may present a list of the contexts 438 on a user interface 450. A user may then manually select one of the listed contexts and the associated processing parameter set 432 may be retrieved and provided to the audio processor 410 as the active processing parameter set 425. For example, assuming the user interface includes a display with a touch screen, the list of contexts may be displayed on the user interface as array of soft buttons. The user may then select one of the contexts by pressing the associated button.

Datasets (i.e., processing parameter sets 432 and associated indicators 434, 436, 438) may be entered into the dataset memory 430 in several ways. Datasets may have been stored in the dataset memory 430 during manufacture of the personal audio system 400. Datasets may have been stored in the dataset memory 430 during installation of an application or "app" on the personal computing device that is a portion of the personal audio system.

Additional datasets stored in the dataset memory 430 may have been created by the user of the personal audio system 400. For example, an application running on the personal computing device may present a graphical user interface through which the user can select and control parameters to edit an existing processing parameter set and/or to create a new processing parameter set. In either case, the edited or new processing parameter set may be saved in the dataset memory 430 in association with one or more of a current ambient sound profile provided by the profile developer 422, a location of the personal audio system 400 provided by the geo-locator 460, and a context or name entered by the user via the user interface 450. The edited or new processing parameter set to be saved in the dataset memory 430 automatically or in response to a specific user command.

Datasets may be developed by third parties and made accessible to the user of the personal audio system 400, for example, via a network.

Further, datasets may be downloaded from the cloud, such as from the sound knowledgebase 150 in the cloud 130, and stored in the dataset memory 430. For example, newly available or revised processing parameter sets 432 and associated indicators 434, 436, 438 may be pushed from the cloud to the personal audio system 400 automatically. Newly available or revised processing parameter sets 432 and associated indicators 434, 436, 438 may be downloaded from the cloud by the personal audio system 400 at periodic intervals. Newly available or revised processing parameter sets 432 and associated indicators 434, 436, 438 may be downloaded from the cloud by the personal audio system 400 in response to a request from a user.

To support development of new and/or revised processing parameter sets, the personal audio system may upload information, such as to the sound knowledgebase 150 in the cloud 130.

The personal audio system may contain an audio snippet memory 440. The audio snippet memory 440 may be, for example, a revolving or circular buffer memory having a fixed size where the newest data overwrites the oldest data such that, at any given instant, the buffer memory contains a predetermined amount of the most recently stored data. The audio snippet memory 440 may store, for example, the most recent audio stream data for a period of 2 seconds, 5 seconds, 10 seconds, 30 seconds, or some other period.

The audio snippet memory 440 may store a "most recent portion" of an audio stream, where the "most recent portion" is the time period immediately preceding the current time. The audio snippet memory 440 may store the most recent portion of the ambient audio stream input to the audio processor 410 (as shown in FIG. 4), in which case the audio snippet memory 440 may be located within one or both of the active acoustic filters of the personal audio system. The audio snippet memory 440 may store the most recent portion of an audio stream derived from the audio interface 350 in the personal computing device of the personal audio system, in which case the audio snippet memory may be located within the personal computing device 120. In either case, the duration of the most recent portion of the audio stream stored in the audio snippet memory 440 may be sufficient to capture very low frequency variations in the ambient sound such as, for example, periodic frequency modulation of a siren or interruptions in a baby's crying when the baby inhales.

The personal audio system my include an event detector 424 to detect trigger events, which is to say events that trigger uploading the content of the audio snippet memory and associated metadata to the remote device. The event detector 424 may be part of, or coupled to, the controller 420. The event detector 424 may detect events that indicate or cause a change in the active processing parameter set 425 used by the audio processor 410 to process the ambient audio stream. Examples of such events detected by the event detector include the user entering commands via the user interface 450 to modify the active processing parameter set 425 or to create a new processing parameter set; the user entering a command via the user interface 450 to save a modified or new processing parameter set in the dataset memory 430; automatic retrieval, based on location or ambient sound profile, of a selected processing parameter set from the dataset memory 430 for use as the active processing parameter set; and user selection, for example from a list or array of buttons presented on the user interface 450, of a selected processing parameter set from the dataset memory 430 for use as the active processing parameter set. Such events may be precipitated, for example, by a change in the ambient sound environment or by user dissatisfaction with the sound of the personal audio stream obtained with the previously-used active processing parameter set.

Application Ser. No. 14/952,761, "Processing Sound Using Collective Feedforward", describes a personal audio system that, in response to a trigger event, uploads a most recent audio snippet (i.e., the content of an audio snippet memory) and associated metadata to a remote device. Uploading the most recent audio snippet allows the remote device to perform various analyses to determine the characteristics of the ambient sound immediately prior to the event. However, the most recent audio snippet may contain speech of the user of the personal audio system or other persons. Thus uploading the most recent audio snippet may raise privacy concerns.

The personal audio system 400 may include a feature extractor 426 to extract feature data from the most recent audio snippet stored in the audio snippet memory 440. Feature data that may be extracted from the most recent audio snippet include, for example, data such as means (arithmetic, geometric, harmonic), centroid, variance, standard deviation, spectral skew, kurtosis, spectral envelope shape, spectral rolloff, spread, flatness, spectral flux, Mel frequency cepstral coefficients, pitch, tonal power ratio, harmonic-to-average power ratio, maximum of autocorrelation function, zero crossing rate, RMS power, peak power, crest factor, and/or amplitude/power envelope including estimation of attack/decay rates.

Upon detection of an event by the event detector 424, the feature extractor 426 may extract feature data from the most recent audio snippet stored in the audio snippet memory. The type of audio featurization to apply, and the type and amount of feature data extracted from the most recent audio snippet may depend on the characteristics of the stored audio. Some feature data may be extracted from the entire content of the audio snippet memory 440 and other feature data may be extracted from multiple consecutive time slices of the audio data stored in the audio snippet memory 440. The extracted feature data may then be transmitted to a remote device such as the sound knowledge base in the cloud 130. The feature data transmitted to the remote device may be configured to allow analysis of the ambient sound immediately preceding the event, but not allow reconstruction of speech or recognition of the user or other speakers.

Metadata may be transmitted along with the extracted feature data. The transmitted metadata may include a location of the personal audio system 400, which may be provided by the geo-locator 460. When the trigger event was a user-initiated or automatic retrieval of a selected processing parameter set from the parameter memory, the transmitted metadata may include an identifier of the selected processing parameter set and/or the complete selected processing parameter set. When the trigger event was the user modifying a processing parameter set or creating a new processing parameter set, the transmitted metadata may include the modified or new processing parameter set. Further, the user may be prompted or required to enter, such as via the user interface 450, a context, descriptor, or other tag to be associated with the extracted feature data and transmitted. To preserve user privacy, the transmitted metadata may exclude information that identifies the user or the user's device.

Figure 5:
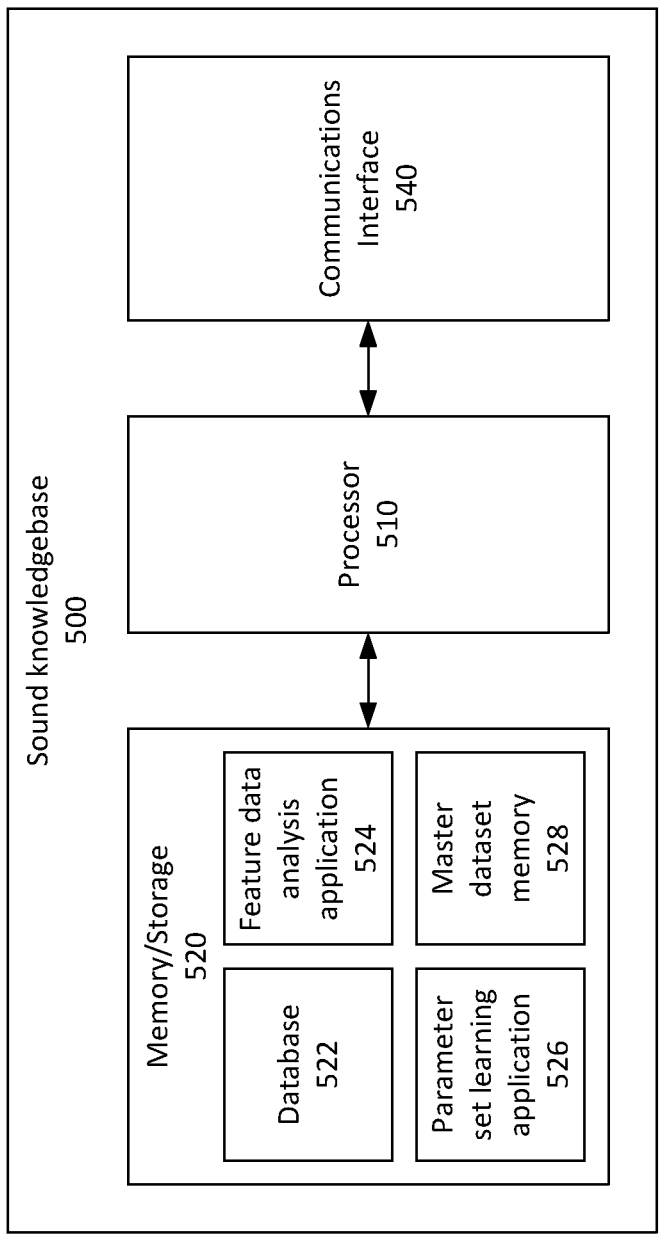
FIG. 5 is a block diagram of a sound knowledgebase.

FIG. 5 is a functional block diagram of an exemplary sound knowledgebase 500, which may be the sound knowledgebase 150 within the sound processing system 100. The sound knowledgebase 500 includes a processor 510 coupled to a memory/storage 520 and a communications interface

540. These functions may be implemented, for example, in a single server computer or by one or more real or virtual servers within the cloud.

The processor 510 may be or include one or more microprocessors, microcontrollers, digital signal processors, application specific integrated circuits (ASICs), or a system-on-a-chip (SOCs). The memory/storage 520 may include a combination of volatile and/or non-volatile memory. The memory/storage 520 may include one or more storage devices that store data on fixed or removable storage media. The term "storage media" means a physical object adapted for storing data, which excludes transitory media such as propagating signals or waves. Examples of storage media include magnetic discs and optical discs.

The communications interface 540 includes at least one interface for wired or wireless communications with external devices including a plurality of personal audio systems.

The memory/storage 520 may store a database 522 having a plurality of records. Each record in the database 522 may include a set of audio feature data and associated metadata received from one of a plurality of personal audio systems, such as the personal audio system 400, via the communication interface 540. The memory/storage 520 may also store software programs and routines for execution by the processor. These stored software programs may include an operating system. The operating system may include functions to support the communications interface 540, such as protocol stacks, coding/decoding, compression/decompression, and encryption/decryption. The stored software programs may include a database application (also not shown) to manage the database 522.

The stored software programs in the memory/storage 520 may include a feature data analysis application 524 to analyze audio feature data received from the plurality of personal audio systems. The feature data analysis application 524 may, for example, extract or develop additional data representing the characteristics and features of the ambient sound at the personal audio system that provided the audio feature data. Additional data extracted or developed by feature data analysis application 524 may be stored in the database 522 as part of the record containing the corresponding audio feature data and metadata.

The stored software programs may include a parameter set learning application 526 to learn revised and/or new processing parameter sets from the audio feature data, additional data, and metadata stored in the database 522. The parameter set learning application 526 may use a variety of analytical techniques to learn revised and/or new processing parameter sets. These analytical techniques may be applied to numerical and statistical analysis of audio feature data, additional data, and numerical metadata such as location, date, and time metadata. These analytical techniques may include, for further example, semantic analysis of tags, descriptors, contexts, and other non-numerical metadata. Further, the parameter set learning application 526 may use known machine learning techniques such as neural nets, fuzzy logic, adaptive neuro-fuzzy inference systems, or combinations of these and other machine learning methodologies to learn revised and/or new processing parameter sets.

As an example of a learning process that may be performed by the parameter set learning application 526, the records in the database 522 may be sorted into a plurality of clusters based according to audio feature data, location, tag or descriptor or some other factor. Some or all of these clusters may optionally be sorted into sub-clusters based on another factor. When records are sorted into clusters or sub-clusters based on non-numerical metadata (e.g., tags or descriptors) semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

The memory/storage 520 may include a master parameter memory 528 to store all processing parameter sets and associated indicators currently used within the sound processing system 100. New or revised processing parameter sets developed by the parameter set learning application 526 may be stored in the master parameter memory 528. Some or all of the processing parameter sets stored in the master parameter memory 528 may be downloaded via the communications interface 540 to each of the plurality of personal audio systems in the sound processing system 100. For example, new or recently revised processing parameter sets may be pushed to some or all of the personal audio systems as available. Processing parameters sets, including new and revised processing parameter sets may be downloaded to some or all of the personal audio systems at periodic intervals. Processing parameters sets, including new and revised processing parameter sets may be downloaded upon request from individual personal audio systems.

Description of Processes

Figure 6:
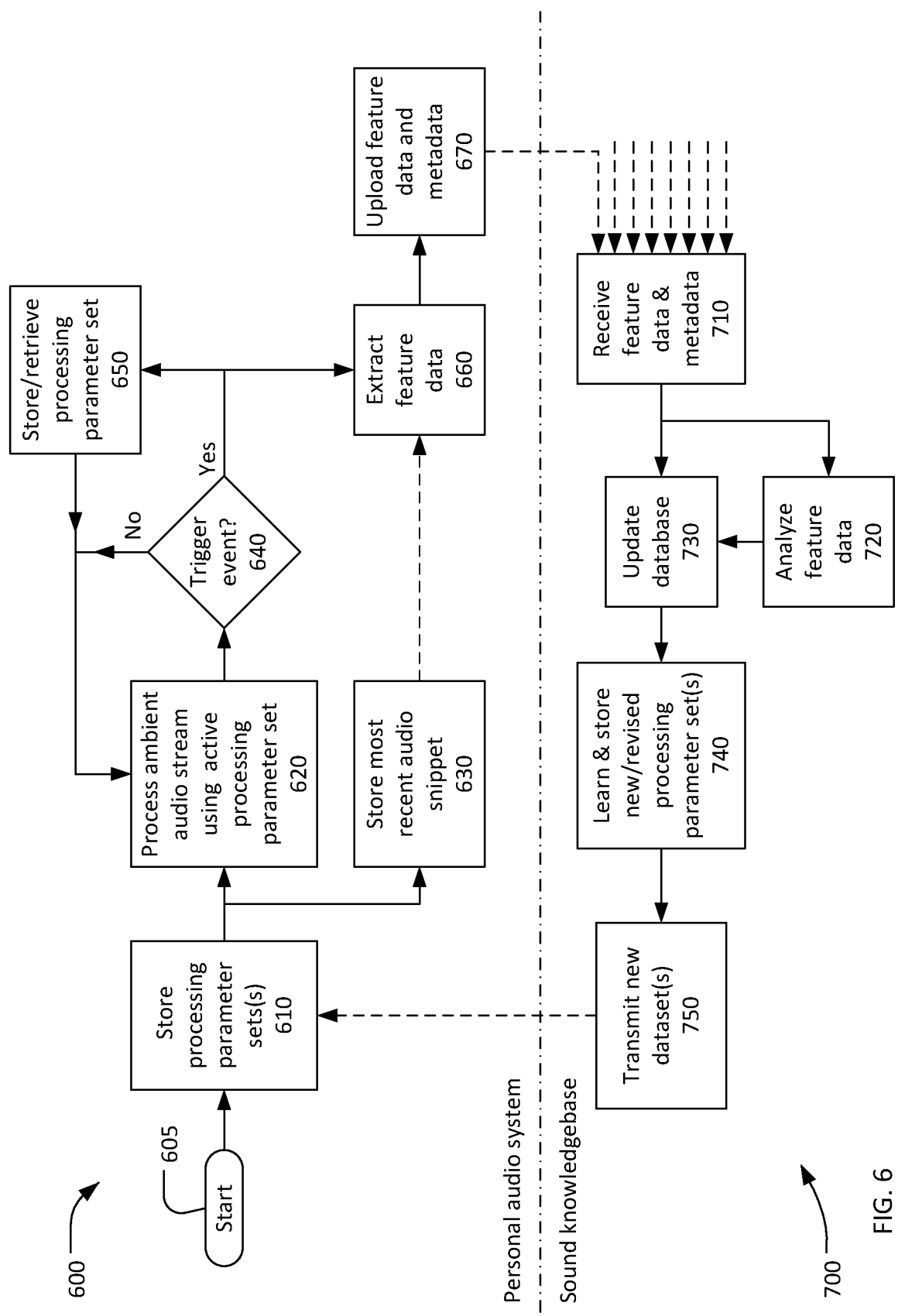
FIG. 6 is a flow chart of a method for processing sound using collective feedforward.

FIG. 6 shows flow charts of methods 600 and 700 for processing sound using collective feedforward. The methods 600 and 700 may be performed by a sound processing system, such as the sound processing system 100 (FIG. 1). The sound processing system may include a large plurality of personal audio systems, each having characteristics as akin to the personal audio system 140 (FIG. 1). The method 700 will, in most cases, produce better results with scale, so having more personal audio systems will usually be better. Thus, having thousands of personal audio systems, or even millions, may produce superior benefits.

The method 600 may be performed by each personal audio system concurrently but not necessarily synchronously. The method 700 may be performed by the sound knowledgebase concurrently with the method 600. All or portions of the methods 600 and 700 may be performed by hardware, by software running on one or more processors, or by a combination of hardware and software. All or portions of the method 600 may be performed by an active acoustic filter, such as the active acoustic filter 200, or may be distributed between an active acoustic filter and a personal computing device, such as the personal computing device 120. Although shown as a series of sequential actions for ease of discussion, the actions from 710 to 750 may occur continuously and simultaneously, and that the actions from 610 to 660 may be performed concurrently by the plurality of personal audio systems. Further, in FIG. 6, process flow is indicated solid arrows and information flow is indicated by dashed arrows.

The method 600 may start at 605 and run continuously until stopped (not shown). At 610, one or more processing parameter sets and associated indicators may be stored in a parameter memory, such as the dataset memory 430, within the personal audio system. Initially, one or more processing parameter sets may be stored in the personal audio system during manufacture or during installation of a personal audio system application on a personal computing device. Subsequently, new and/or revised processing parameter sets and associated indicators may be received from the sound knowledgebase.

At 620, an ambient audio stream derived from ambient sound may be processed in accordance with an active processing parameter set selected from the processing parameters sets stored at 610. Processes that may be performed at 620 were previous described. Concurrently with processing the ambient audio stream at 620, a most recent portion of the ambient audio stream may be stored in a snippet memory at 630, also as previously described.

At 640, a determination may be made whether or not a trigger event has occurred. Trigger events were previously described. When a determination is made at 640 that a trigger event has not occurred ("no" at 640), the processing at 620 and storing at 630 may continue. When a determination is made at 640 that a trigger event has occurred ("yes" at 640), a processing parameter set may be stored or retrieved at 650 as appropriate. At 650, a current processing parameter set, for example, as defined or edited by a user, may be stored in dataset memory 430. At 650, a previously stored processing parameter set may be retrieved from the dataset memory 430, either in repose to a user action or automatically, for example in response to a change in the ambient sound or user location.

At 660, feature data may be extracted from the most recent audio snippet. The audio snippet memory may be located within one or both active acoustic filters, or within a personal computing device, or may be distributed between the active acoustic filters and the personal computing device. Feature extraction may be performed by a processor within one or both active acoustic filters, a processor within the personal computing device, or may be distributed between the active acoustic filters and the personal computing device. Audio snippet data stored in one or both active acoustic filters may be transmitted to the personal computing device prior to feature extraction.

As previously described, data regarding a large number of different features can be extracted from an audio signal. Extracting all of the possible feature data from the most recent audio snippet may present an unreasonable or undesirable burden on the processor(s) within a personal audio system. Further only a subset of the possible feature data may be relevant to any given ambient sound environment.

Figure 7:
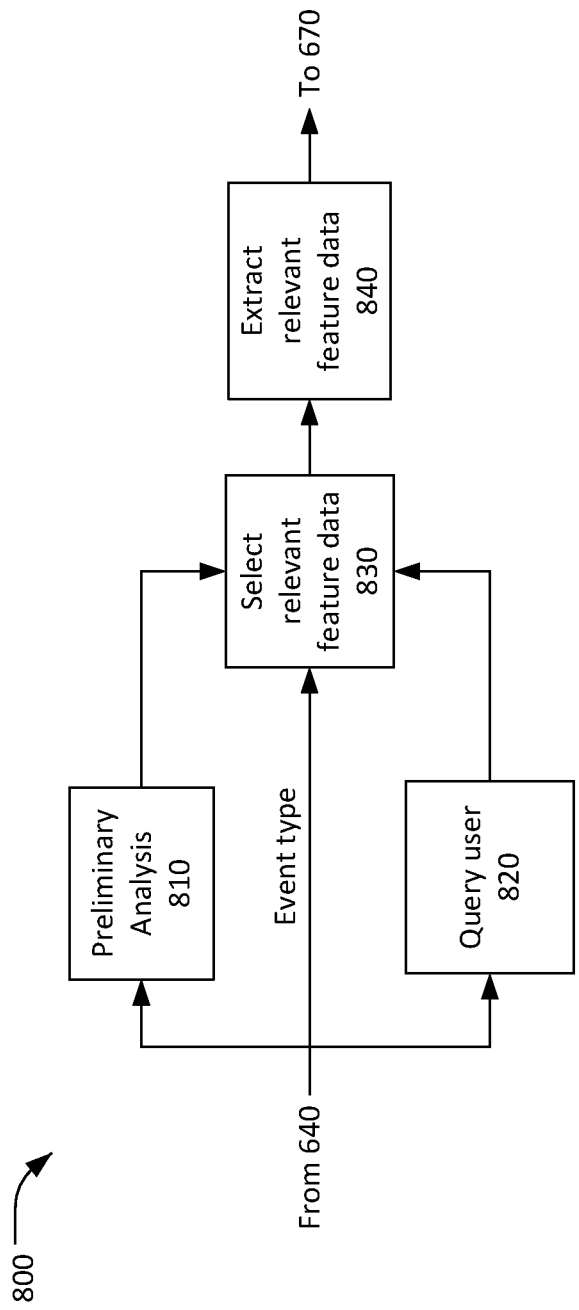
FIG. 7 is a flow chart of a method for extracting features.

To reduce the processing burden, an optional process 800, shown in FIG. 7, may be employed at 660 to preselect relevant feature data before some or all of the feature data is extracted. At 810, a preliminary analysis is performed on the most recent audio snippet. Alternately or additionally, at 820, a query may be sent, via a user interface, to a user to identify a sound (e.g. gunshot, breaking glass, automobile crash, etc.) captured in the most recent audio snippet. At 830, a subset of the possible audio feature data is selected as particularly relevant to the most recent audio snippet. The relevant audio feature data may be selected based on the results of the preliminary analysis at 810, a user response to the query at 820, and/or the type of event detected at 640 (FIG. 6). At 840 the relevant audio feature data is extracted from the most recent audio snippet and subsequently transmitted to the knowledgebase.

The type of features and algorithms for extracting features at 840 and criteria for selecting relevant audio feature data at 830 may evolve over time. For example, the type of features, algorithms for extracting features, and criteria for selecting relevant audio feature data may be defined by the knowledgebase and transmitted to the personal audio system as updates to firmware and/or software for the processors in the active audio filters and/or the personal computing device.

Referring once again to FIG. 6, at 670 the extracted feature data and associated metadata may be transmitted or uploaded to the sound knowledgebase. The uploaded metadata may include a location of the personal audio system provided by a geo-locator within the personal audio system. When the trigger event was a user-initiated or automatic retrieval of a selected processing parameter set from the parameter memory, the uploaded metadata may include an identifier of the selected processing parameter set and/or the actual selected processing parameter set. When the trigger event was the user modifying the active processing parameter or creating a new processing parameter set, the uploaded metadata may include the modified or new processing parameter set. Further, the user may be prompted to enter a context, descriptor, or other tag to be associated with the modified or new processing parameter set and uploaded. The process 600 may then return to 620 and continue cyclically until stopped.

At 710, the sound knowledgebase receives the feature data and associated metadata transmitted at 670 and may receive additional feature data and metadata from other personal audio systems. Analysis may be performed on the received feature data at 720. The audio analysis at 720 may develop additional data about the features and characteristics of the ambient audio at the personal audio system. The additional data developed by the audio analysis at 720 may be stored in a database at 730 in association with the corresponding audio feature data and metadata received at 710.

At 740, machine learning techniques may be applied to learn revised and/or new processing parameter sets from the feature data, additional data, and metadata stored in the database 730. A variety of analytical techniques may be used to learn revised and/or new processing parameter sets. These analytical techniques may include, for example, numerical and statistical analysis of feature data, additional data, and metadata such as location, date, and time metadata. These analytical techniques may include, for further example, semantic analysis of tags, descriptors, contexts, and other non-numerical metadata.

As an example of a learning process that may be performed at 740, some or all of the records in the database at 730 may be sorted into a plurality of clusters based according to feature data, location, tag or descriptor, or some other factor. Some or all of these clusters may optionally be sorted into sub-clusters based on another factor. When records are sorted into clusters or sub-clusters based on non-numerical metadata (e.g. tags or descriptors) semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

New or revised processing parameter sets learned and stored at 740 may be transmitted to some or all of the plurality of personal audio systems at 750. For example, new or recently revised processing parameter sets may be pushed to some or all of the personal audio systems on an as-available basis, which is to say as soon as the new or recently revised processing parameter sets are created. Processing parameters sets, including new and revised processing parameter sets may be transmitted to some or all of the personal audio systems at predetermined periodic intervals, such as, for example, nightly, weekly, or at some other interval. Processing parameters sets, including new and revised processing parameter sets may be transmitted upon request from individual personal audio systems. Processing parameter sets may be pushed to, or downloaded by, a personal audio system based on a change in the location of the personal audio system. For example, a personal audio system that relocates to a position near or in an airport may receive one or more processing parameters sets for use in suppressing aircraft noise.

Figure 8:
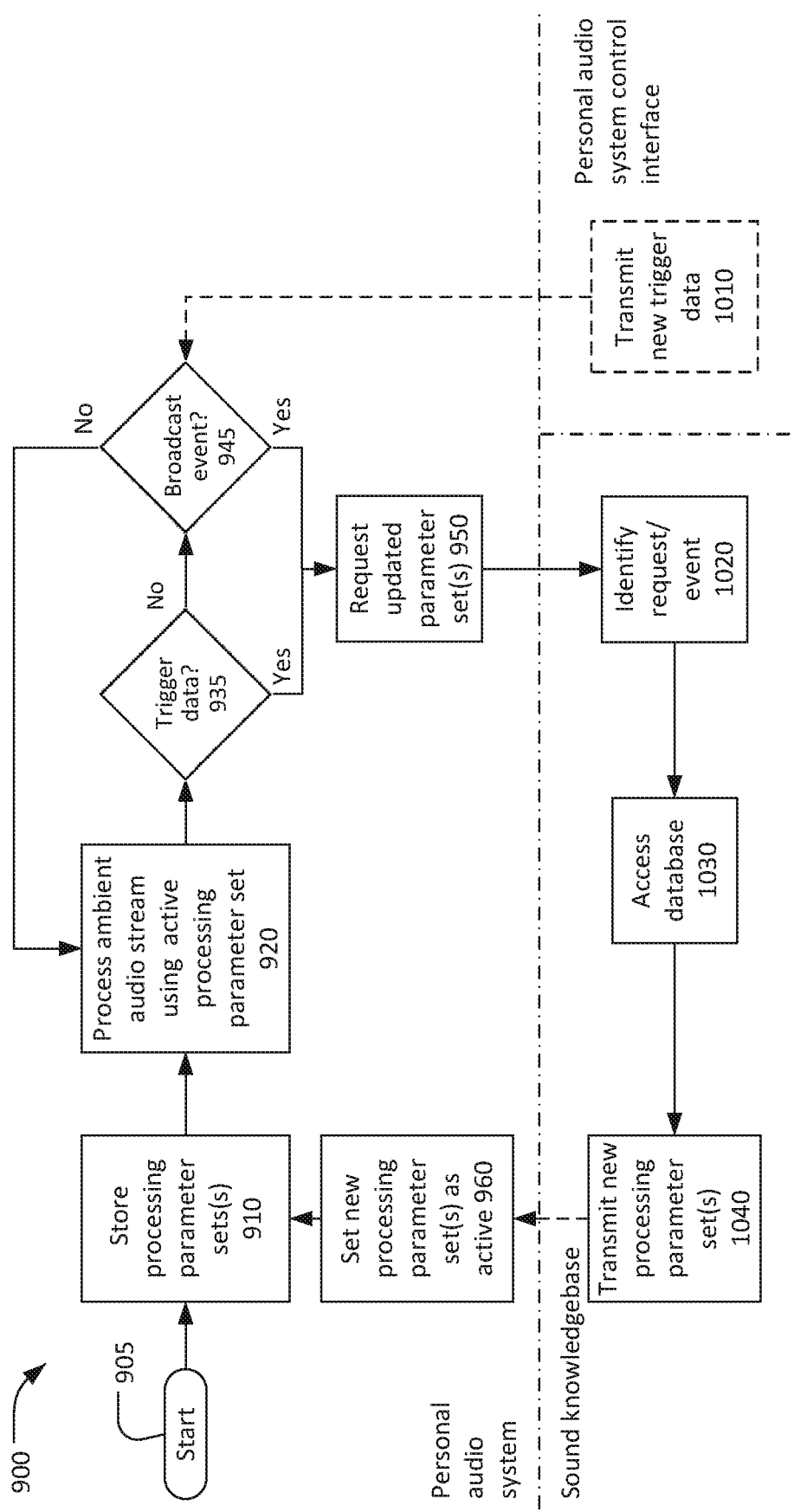
FIG. 8 is a flow chart of a method for processing sound using shared personalized audio settings.

FIG. 8 shows a flow chart of a method for processing sound using shared personalized audio settings.

The method 900 may start at 905 and run continuously until stopped (not shown). The actions at 910 to 920 are the same as the corresponding actions (610 to 620) in the process 600 as shown in FIG. 6. Descriptions of these actions will not be repeated.

While processing is ongoing, the processor 230 (FIG. 2) in the personal audio system or processor 310 (FIG. 3) in a personal computing device 120 (e.g. a controller) may search for specific changes during ongoing operation. First, the associated processor may search for a trigger data at 935. "Trigger data" is data that is detectable by the processor and that indicates that a different set of processing parameters should be used. Trigger data may merely point a recipient to a location where new processing parameters may be found (e.g. on a network) or may include, in embedded form, the new processing parameters to be used. Trigger data include changes in location of the personal audio system, changes in the audio environment, changes in aspects of the audio environment, a personal audio system user "request" to search for new processing parameters, and user manual selection of different processing parameters.

A trigger data, in the case in which processing parameters are stored on storage medium readily available to the personal audio system or is encoded within the trigger data itself, the personal audio system may immediately result in loading of those processing parameters and beginning processing based upon those processing parameters. However, in the event that the trigger data is associated with processing parameters that are not stored locally to the personal audio system, those parameters must be requested at 950. In some cases, the personal audio system may be unaware whether updated or different processing parameter set(s) exist for a given trigger data. In such cases, the request at 950 may be made without any understanding by the personal audio system whether new processing parameter set(s) will be provided as a result of the request.

Alternatively, the audio or network environment itself may broadcast trigger data as a broadcast event at 945 in the form of trigger data embedded in ambient sound (such that it appears in the resulting ambient audio stream created by a personal audio system) or a network data broadcast or both. The trigger data, potentially including a set of processing parameters, may be selected by a third party such as a DJ at a club, an artist, or a sporting event audio technician, then downloaded and used by each user of a personal audio system.

Trigger data may be embedded within the ambient sound. This embedding may be performed by a device such as the personal audio system control interface 160 (FIG. 1) with subliminal, ultrasonic, or audible audio signals perceptible to personal audio systems. Once trigger data is embedded into the ambient sound, it may act to instruct receiving personal audio systems to begin operating using a set of processing parameters determined by the user of the personal audio system control interface. This user transmitting the trigger data as a part of the ambient sound may be, for example, the audio technician associated with a touring band, a concert, a venue, or a particular sporting event. This user may also be the artist him, her, or themselves.

In such cases, artists or sporting event audio technicians may embed trigger data be it subliminal, ultrasonic, or audible, into sound that is broadcast over the venue or location's loudspeakers. Personal audio systems may convert that ambient sound to an ambient audio stream and, if tuned to detect such trigger data, may receive trigger data indicating that a set of processing parameters is available for download from a sound knowledgebase 150. Trigger data may include a specific sound knowledgebase identification and/or a specific identification (e.g. a web address or sub-directory) where those processing parameter sets may be obtained.

Alternatively, the trigger data may include associated processing parameters as embedded data in an encoded form. In a manner similar to an audio-based telephone modem, trigger data may be embedded in ambient sound, in whatever frequency, modulation, or type; such that the trigger data may be captured, decoded, and acted upon. In the case of embedded processing parameters, the trigger data in audio form may include both the processing parameters to be used and instructions to begin using the processing parameters.

Such a broadcast provides a convenient way of transmitting relatively simple processing parameter data to listeners with the added benefit that the transmitter can be sure that the user of those parameters is actually listening to the ambient sound for which those processing parameters are intended. Specifically, the processing parameters are embedded within the ambient sound to which they pertain. This has the added benefit of requiring essentially no extra power consumption because the same audio processing will take place regardless of whether there are processing parameters embedded within audio trigger data in the ambient sound or not. This saves power potentially being wasted on wireless data transfer protocols if it is unnecessary and requires essentially no additional processing to merely check ambient sound for trigger data.

Still further alternatively, the broadcast event at 945 may take place via network data broadcast. Network data broadcast, as used herein, means a data transmission from one device and receivable at another device transmitted over a network communications channel. For example, the personal computing device 120 and/or personal audio system 140 may be in network communication with (or on the same network as) one or more network devices such as wireless WiFi routers, Bluetooth®, near field communications protocols, the cellular (or other mobile) data network, other nearby personal computing devices and/or personal audio systems 140', or a personal audio system control interface 160. These nearby devices may similarly broadcast trigger data indicating that there are new sets of processing parameters (or the specifics of those processing parameters) available for use by personal audio systems. These broadcasts may occur at regular intervals as a part of network communication data regularly or periodically sent to personal audio systems. In some cases, nearby personal audio systems of a type similar to a personal audio system may broadcast or re-broadcast trigger data or sets of processing parameters being used by those devices so that, over time, a plurality of personal audio systems may, if elected by the user of a personal audio system, use the same sets of processing parameters.

Just as above, trigger data or sets of processing parameters may be broadcast automatically, periodically, and/or manually at the behest or direction of a DJ, a musician, an audio technician, or other, similar, individual at a venue, location or in a particular space. In the case of network data broadcast, particular ports, frequencies, or other broadcast techniques may be used to differentiate such data from typical network data traffic. The network broadcast may merely include trigger data indicating that different set(s) of processing parameters are available or, may, in some cases include an identification of those processing parameter set(s) or locations where they may be obtained using a network.

In cases in which a broadcast event is used, that event may come from a personal audio system control interface or another personal audio system which transmits the new event at 1010. This event may be generated by a sound knowledgebase, by another user of a personal audio system or may be generated by a user of a personal audio system control interface (as shown in FIG. 8). A user of a personal audio system may have the opportunity to change settings on the personal audio system to "look for" or to "ignore" such trigger events and broadcast events. Preferably, more individuals working together to tweak and change the processing parameter set(s) will result in better processing parameter set(s) for every user's use. So, personal audio systems may, by default, be set to look for broadcast events or trigger events.

Once the request for updated parameter set(s) is sent by the personal audio system at 950, the sound knowledgebase to which the request is directed identifies the request or triggering event at 1020. As discussed above, the request may specifically identify one or more set(s) of processing parameters or may be a direct-access link or request for particular set(s) of processing parameters. Whichever the case, the sound knowledgebase may identify which processing parameters are relevant to the request/event at 1020. Next, the identified processing parameter set(s) are accessed at 1030 so that they may be transmitted to one or more personal audio systems at 1040.

This transmission may take the form of a requested download or may be broadcast or unicast to multiple personal audio systems simultaneously. Similarly, to avoid overload on a central sound knowledgebase once a processing parameter set is changed, a central sound knowledgebase may transmit the requested processing parameter set(s) to one or more personal audio systems with instructions for those systems to re-transmit those parameter set(s) to other, nearby personal audio systems to thereby lower the overall network load on a single device.

Once transmitted at 1040, the processing parameters may be stored at 910 and, because they have been identified as relevant to the trigger event or broadcast event, may be set to the active processing parameter set(s) at 960 and used to process the ambient audio stream at 920. At this point, the process may continue, periodically checking for trigger events or broadcast events at 935 and 945, respectively.

The processing parameters transmitted by the sound knowledgebase may also identify one or more secondary audio streams (discussed above with respect to FIG. 4) identified by the same artist, audio technician, DJ, another personal audio system user or other, similar individual. In this way, ambient audio stream and secondary audio stream may be combined, both as directed by that other individual with one or both of the ambient audio stream and secondary audio stream processed according to the processing parameter set(s) selected by that individual. In some cases, the ambient audio stream may be processed by one set of processing parameters identified by the individual, while the secondary audio stream is processed using a different set of processing parameters. Both sets may be identified by an individual other than the user of the personal audio system. In some cases, the processing parameter set(s) may be identified or selected by someone different from the source of the ambient audio stream or the secondary audio stream.

Figure 9:
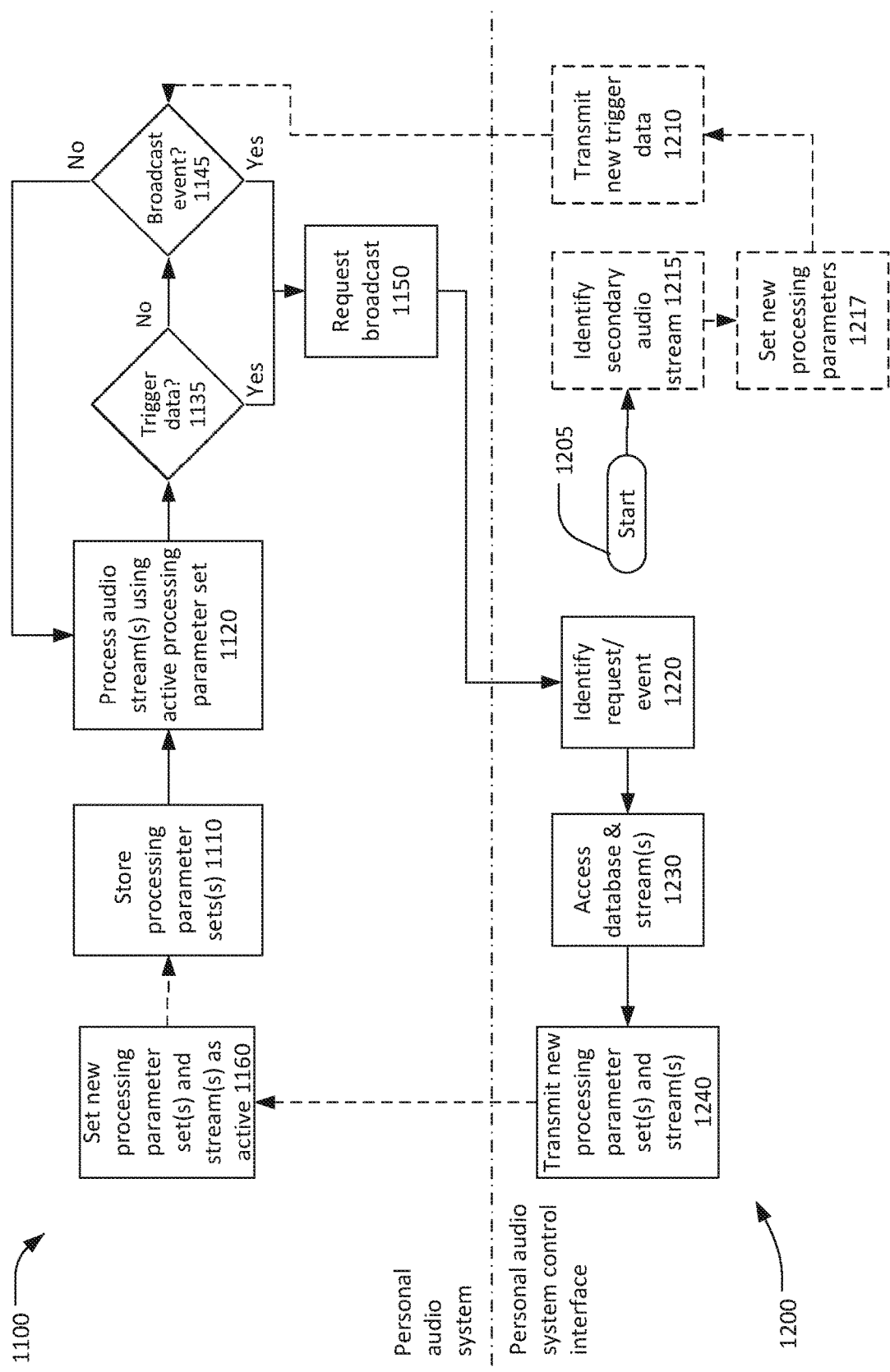
FIG. 9 is a flow chart of a method for providing an ambient audio stream, a secondary audio stream and associated processing parameters to other users of a personal audio system.

Turning now to FIG. 9, a flow chart of a method for providing a secondary audio stream and associated processing parameters to other users of a personal audio system. FIG. 9 comprises method 1100 and method 1200, the first taking place on a personal audio system and the second taking place on a personal audio system control interface or another personal audio system (not shown). Method 1100 is quite similar to method 900 in FIG. 8. However, the other personal audio system or personal audio system control interface may be viewed as the initiator of the overall process such that an individual user of a personal audio system control interface may act as a broadcaster him- or herself, to other users of similar personal audio systems. Thus, the process begins at 1205.

In some cases, a user may broadcast only the trigger data and/or processing parameters for ambient audio, as discussed above with respect to FIG. 8. However, in other cases like that shown in FIG. 9, a user of the personal audio system control interface (or personal audio system) may identify ambient secondary audio stream at 1215 for broadcast, alone or along with associated processing parameters. For example, a secondary audio stream such as a beat, or a sound effect, or commentary provided by the user or a third party may be "overlaid" on top of ambient audio and associated processing parameters as directed by the user broadcasting the secondary audio stream and processing parameters. Trigger data and/or processing parameters may also be transmitted along with the broadcast. The source of a secondary audio stream may be locally accessible to the personal audio system itself, from a cloud storage location, such as an Internet radio service or streaming service or from an online service designed for the storage and/or broadcasting of audio streams. The secondary audio streams may come, for example, from the personal audio system control interface, directly from musical instruments during a live performance or from any other secondary audio source.

Once a secondary audio stream is identified at 1215, the user may also set processing parameters for that secondary audio stream at 1217.

Once the secondary audio stream has been identified at 1215, and any processing parameters have been selected at 1217, the personal audio system control interface (or other personal audio system) may transmit trigger data at 1210. The trigger data may merely be a notification that a new secondary audio stream and related processing parameters are available from the personal audio system control interface (or personal audio system). Alternatively, the trigger data may be or include the processing parameters and access to the secondary audio stream itself (e.g. a URL from which the secondary audio stream may be streamed with or without a key that enables access or another identification of where the secondary audio stream may be obtained).

Broadcast of this new trigger data may cause another personal audio system to detect a broadcast event at 1145. The broadcast event determination may cause the personal audio system to request the associated broadcast at 1150. In some cases, a formal request may be unnecessary, for example, streaming of the broadcast is occurring in a unicast fashion such that any device may "listen" on a particular frequency, channel or other logical location to access the secondary audio stream and/or processing parameters that are being continually broadcast (or broadcast during a known time period) to any listening personal audio system. As discussed above, this may be a uniform resource locator of an associated secondary audio stream, may be a database referrer to the personal audio system control interface requesting access to the audio stream. Many other forms are envisioned.

Once received the personal audio system control interface may identify the associated request/event at 1220 in order to begin providing the secondary audio stream(s) and any processing parameters). The broadcast event detected at 1145 may have been delayed or may be intentionally delayed so that the request is now not actually for a live broadcast, but instead may be a stored copy of the secondary audio stream(s) and any processing parameters. Thus, the identified request/event at 1220 may be live audio or may be a stored copy of a previous set of stored secondary audio stream(s) and processing parameters.

The database of current (or stored) secondary audio stream(s) and processing parameters may be accessed at 1230 in order to find the requested event. This database may not actually be a part of the personal audio system control interface but may instead be a web-based storage system or service, a cloud storage system or service, a high-availability web server designed for audio and/or video streaming. As a personal audio system control interface creates the associated secondary audio stream(s) and processing parameter set(s), they may be substantially simultaneously uploaded to one of these high availability services so that while being "broadcast" by the personal audio system control interface, they are actually being delivered to listening end-users by a high availability service.

The personal audio system control interface (or database associated therewith) may then transmit the processing parameter set(s) and associated secondary audio stream(s) to the personal audio system(s) of requesting users. As discussed above, the transmission may come from one or more high availability internet services.

After the secondary audio stream(s) begin being transmitted along with the processing parameter set(s), the requesting personal audio system may set those audio stream (s) and processing parameter set(s) as active at 1160. The processing parameter set(s) may be stored at 1110. The stream(s) may then be streamed and processed using the parameter set(s) at 1120 while awaiting trigger data at 1135 (discussed above with respect to FIG. 8, element 935) or a broadcast event 1145. Should a personal audio system control interface or other personal audio system transmit a new event at 1210, then the process can begin again.

Accordingly, using the process described, a personal audio system or a personal audio system control interface may act as an audio source for secondary audio stream(s) along with any processing parameter set(s) for nearby users in real-time, faraway users in real-time, or as the source of a recording that is stored for subsequent re-broadcast to other users via a high availability source or to be shared via social networks, the Internet, or services specifically dedicated to sharing audio stream(s) along with processing parameter set(s).

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

What is claimed is:

1. A personal audio system, comprising:
a housing configured to interface with a user's ear;
an input subsystem disposed within the housing and comprising a microphone, a preamplifier and an analog to digital converter coupled to one another, the input subsystem configured to convert ambient sound into an ambient audio stream;
a memory storing data defining a plurality of processing parameter sets, wherein each of the plurality of processing parameter sets is associated with a combination of at least one of a corresponding location, a corresponding ambient sound profile, and a corresponding context;
a processor disposed within the housing and coupled to the input subsystem, the processor configured to generate a processed ambient audio stream by processing the ambient audio stream in accordance with a selected set of processing parameters selected from the plurality of processing parameter sets stored in the memory;
a geo-locator configured to determine a current location of the personal audio system;
a controller, in communication with the processor, wherein the controller is configured to determine a current ambient sound profile by extracting feature data from the ambient audio stream, wherein the controller is configured to determine a current context according to a user selection, wherein the controller is configured to select the selected set of processing parameters according to the current location, the current ambient sound profile, and the current context, and wherein the controller is configured to instruct the processor to begin generating the processed ambient audio stream by using the selected set of processing parameters; and
an output subsystem disposed within the housing and coupled to the processor, the output subsystem comprising a digital to analog converter, an amplifier and a speaker coupled to one another, the output subsystem configured to convert the processed ambient audio stream into processed output sound for the user's ear.

2. The personal audio system of claim 1, further comprising:
a communications interface in communication with the controller and the processor, the communications interface configured to receive a new set of processing parameters, selected by someone other than the user,
wherein the controller is configured to use the new set of processing parameters as the selected set of processing parameters.

3. The personal audio system of claim 1, further comprising:
a communications interface in communication with the controller and the processor,
wherein the current location is transmitted using the communications interface to a sound knowledgebase for use in determining if the current location is associated with a location-specific set of processing parameters that may be used by the personal audio system as a new set of processing parameters, and wherein when the location-specific set of processing parameters associated with the current location exists, the communications interface receiving the location-specific set of processing parameters, and
wherein the controller is configured to use the location-specific set of processing parameters as the selected set of processing parameters.

4. The personal audio system of claim 1, wherein the combination of at least one of the corresponding location, the corresponding ambient sound profile, and the corresponding context corresponds to a combination of all three of the corresponding location, the corresponding ambient sound profile, and the corresponding context for each of the plurality of processing parameter sets.

5. The personal audio system of claim 1, wherein the current location corresponds to an area defined by one of a center point and a radius, a pair of coordinates identifying diagonal corners of a rectangular area, and a series of coordinates identifying vertices of a polygon.

6. The personal audio system of claim 1, wherein the feature data includes one or more of an overall loudness level, a normalized loudness of predetermined frequency bands, an absolute loudness of predetermined frequency bands, a spectral envelope shape, a rising pitch, and a falling pitch.

7. The personal audio system of claim 1, wherein the feature data includes one or more of frequencies of dominant narrow-band sounds, normalized loudness levels of dominant narrow-band sounds, absolute loudness levels of dominant narrow-band sounds, an indicator of a presence of harmonics, an indicator of absence of harmonics, a normalized loudness of noise, an absolute loudness of noise, and a low frequency periodicity.

8. The personal audio system of claim 1, wherein the corresponding context is a descriptive name of an environment or situation in which at least one of the plurality of processing parameter sets is appropriate.

9. The personal audio system of claim 1, wherein the housing is an earbud housing configured to fit, at least partially, within and be supported by the user's ear.

10. The personal audio system of claim 1, wherein:
the processor is further configured to search for trigger data within the ambient audio stream, the trigger data identifying a new set of processing parameters that is available for use in processing the ambient sound; and
when the trigger data is present, the processor is further configured to access the memory to obtain the new set of processing parameters and instruct the processor to begin to process the ambient audio stream using the new set of processing parameters as the selected set of processing parameters.

11. The personal audio system of claim 10, further comprising:
a communications interface in communication with the controller and the processor, wherein the communications interface is configured to request download of the new set of processing parameters from a sound knowledgebase in response to the trigger data.

12. The personal audio system of claim 1, further comprising:
a communications interface in communication with the controller and the processor; and
a user interface configured to receive instructions from the user to manually attempt to obtain a new set of processing parameters,
wherein the controller is further configured to instruct the communications interface, in response to the instructions from the user, to search a sound knowledgebase for the new set of processing parameters available for use in processing the ambient sound and wherein when the new set of processing parameters is available, the controller configured to instruct the communications interface to obtain the new set of processing parameters and to instruct the processor to begin processing the ambient audio stream using the new set of processing parameters as the selected set of processing parameters.

13. The personal audio system of claim 1, further comprising:
a communications interface in communication with the controller and the processor,
wherein the controller is further configured to listen for trigger data within a network data broadcast using the communications interface, the trigger data identifying a new set of processing parameters that is available for use in processing the ambient sound, and
when the trigger data is present, instructing the processor to begin processing the ambient audio stream using the new set of processing parameters as the selected set of processing parameters.

14. The personal audio system of claim 13, wherein the controller is further configured to request download of the new set of processing parameters from a sound knowledgebase in response to the trigger data.

15. The personal audio system of claim 13, wherein the trigger data is broadcast by one of (a) network equipment at a location and (b) another, nearby user of a similar personal audio device.

16. The personal audio system of claim 13, wherein the trigger data identifies a secondary audio stream for inclusion in the processed ambient sound as modified by the new set of processing parameters.

17. The personal audio system of claim 1, wherein the feature data includes one or more of an arithmetic mean, a geometric mean, a harmonic mean, a centroid, a variance, and a standard deviation.

18. The personal audio system of claim 1, wherein the feature data includes one or more of a spectral skew, a kurtosis, a spectral envelope shape, a spectral rolloff, a spread, a flatness, and a spectral flux.

19. A method of processing ambient sound in a personal audio system, the method comprising:
converting ambient sound into an ambient audio stream using an input subsystem disposed within a housing and comprising a microphone, a preamplifier and an analog to digital converter coupled to one another;

storing data, in a memory, the data defining a plurality of processing parameter sets, wherein each of the plurality of processing parameter sets is associated with a combination of at least one of a corresponding location, a corresponding ambient sound profile, and a corresponding context;

generating a processed ambient audio stream by using a processor disposed within a housing and coupled to the input subsystem to process the ambient audio stream in accordance with a selected set of processing parameters selected from the plurality of processing parameter sets stored in the memory;

determining, using a geo-locator, a current location of the personal audio system;

determining, by a controller, a current ambient sound profile by extracting feature data from the ambient audio stream;

determining, by the controller, a current context according to a user selection;

selecting, by the controller, the selected set of processing parameters according to the current location, the current ambient sound profile, and the current context;

instructing, by the controller, the processor to begin generating the processed ambient audio stream by using the selected set of processing parameters; and converting the processed ambient audio stream into processed output sound for a user's ear using an output subsystem disposed within the housing and coupled to the processor, the output subsystem comprising a digital to analog converter, an amplifier and a speaker coupled to one another.

20. A non-transitory computer readable medium storing a computer program that, when executed by a processor, controls an apparatus to execute processing including the method of claim 19.

* * * * *